March 15, 1938.  B. G. CARLSON  2,111,388
CAGING MEANS FOR DIRECTIONAL GYROSCOPES
Filed Dec. 27, 1935
Fig. 1.
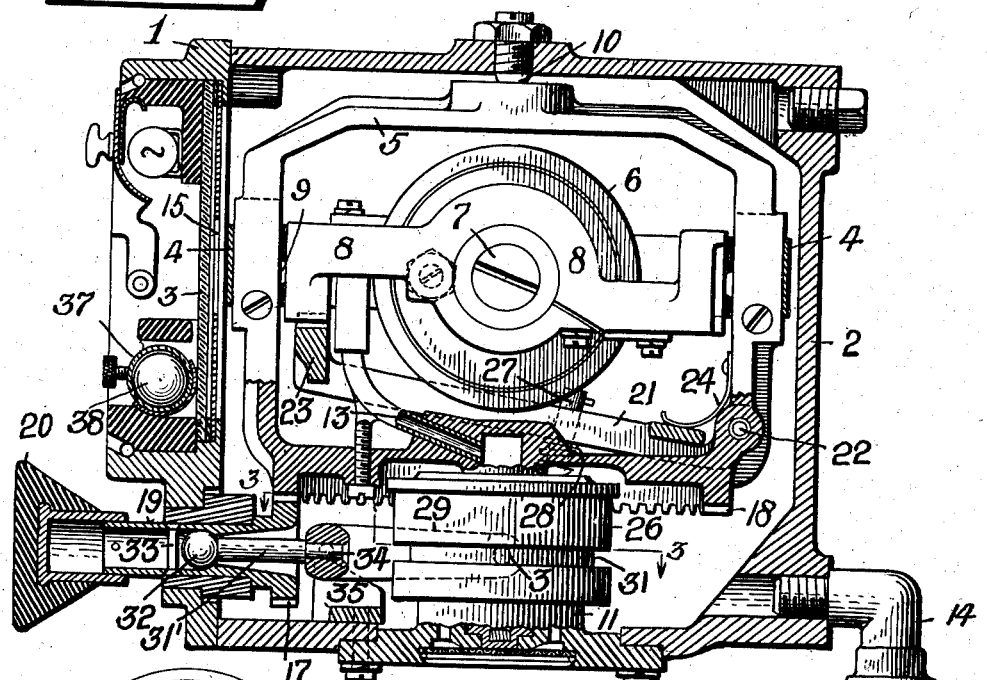
Fig. 2.
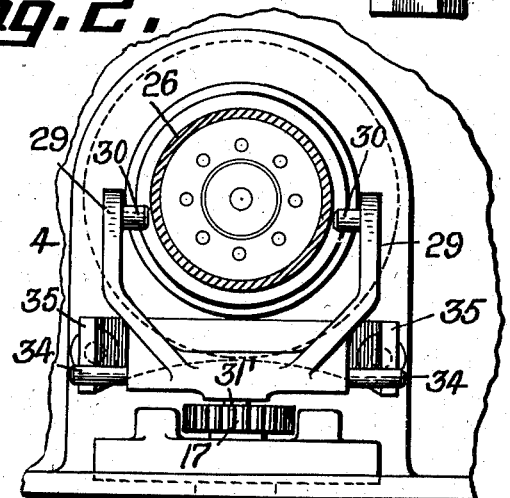
Fig. 3.
INVENTOR
BERT G. CARLSON
BY
Herbert H. Thompson
HIS ATTORNEY.

Patented Mar. 15, 1938

2,111,388

UNITED STATES PATENT OFFICE 2,111,388

CAGING MEANS FOR DIRECTIONAL GYROSCOPES

Bert G. Carlson, Bellerose, N. Y., assignor to Sperry Gyroscope Company, Inc., Brooklyn, N. Y., a corporation of New York Application December 27, 1935, Serial No. 56,316

4 Claims. (Cl. 33—204)

This invention relates, generally, to course and bank indicating devices for dirigible craft, and the invention has reference, more particularly, to a novel improved caging device for directional gyroscopes and to bank indicating means for use therewith, said devices being especially suitable for use upon aircraft.

In Patent No. 1,974,220 of September 18, 1934, assigned to the present assignee, there is disclosed a form of caging and setting means for direction indicators having an operating knob that is pulled out during the normal operation of the instrument, whereby such normally projecting knob constitutes an obstruction that is somewhat undesirable and which may possibly cause injury to the pilot in the event of a minor crack-up.

The principal object of the present invention is to provide an improved directional gyroscope having novel caging and setting means so constructed and arranged that the operating knob thereof is pushed in so as to be out of the way during the normal operation of the instrument, the knob being pulled out only when setting the instrument.

Other objects and advantages will become apparent from the specification, taken in connection with the accompanying drawing wherein the invention is embodied in concrete form.

Fig. 1 is a vertical sectional view of a directional gyroscope embodying the improvements of the present invention.

Fig. 2 is a view of the dial portion of the front face of the instrument.

Fig. 3 is a fragmentary sectional view taken along line 3—3 of Fig. 1.

Similar characters of reference are employed in all the above views to indicate corresponding parts.

Referring now to the said drawing, the reference numeral 1 designates the front cover of the directional gyro adapted to be set in the instrument board of an airplane, the casing 2 of the instrument extending to the rear of the instrument board. Cover 1 is provided with a window 3 for viewing the scale 4 carried by the vertical gimbal ring 5. Scale 4 cooperates with a pointer 15 carried by cover 1 to give an indication to the pilot of relative movements between the airplane and the fixed base line maintained by the gyro. The gyro rotor 6 has a horizontal spinning axis 7 journaled in a gimbal ring 8 that is mounted for movement about a horizontal axis 9 at right angles to axis 7 within the vertical gimbal ring 5. Ring 5 is mounted for oscillation about a vertical axis 10 by being pivoted about said axis within casing 2. As is fully disclosed in the previously identified patent, air for driving rotor 6 enters the bottom of the instrument through the cylindrical bearing 11 and, passing upwardly therethrough, flows into passage 13 leading to the nozzles positioned at the periphery of rotor 6. Air is evacuated from casing 2 by a venturi or pump connected to fitting 14.

The rings 5 and 8 give the gyroscope three degrees of freedom, and in use the same will maintain a fixed base line to cause any deviation of the craft with respect to this base line to be indicated by the relative displacement of the index 15 carried by cover 1, with respect to the scale 4. Thus, with the scale 4 marked in degrees, any deviation of the craft to the right or left from a set course will immediately be discovered by the change in the relative position of pointer 15 with respect to the set course on scale 4.

According to the preferred arrangement, the novel caging and setting mechanism of this invention is adapted for the purpose of resetting the gyro when, after a period of time, a certain amount of wandering has taken place, and for setting the scale 4 to correspond to the cardinal course as indicated by the main indication of a magnetic or other compass, the said mechanism permitting a full 360° movement between the gyro base line and the casing and serving to cage the gyro about the horizontal axis without the necessity of requiring the gyro to be restored in each instance to centralized position in azimuth.

The mechanism for accomplishing such locking around the vertical axis comprises a locking pinion 17 carried by a hollow stem 19 which is slidably mounted in an aperture in cover 1, so that gear 17 may be slid into and out of engagement with an annular gear 18 carried by the ring 5. A knob 20 is fixed on stem 19 for manipulating stem 19 and pinion 17. When knob 20 is pulled out, pinion 17 slides into engagement with gear 18, thus locking the ring 5 in whatever angular position about the vertical axis it may be at the time, such locking being due to the resistance of pinion 17 and its stem 19. By now turning knob 20, pinion 17 serves to rotate gear 18 and the gyro, whereby the latter may be restored when it has wandered off its original setting, or the same may be set upon a new course, if desired, as when changing course.

The above described mechanism is effective for locking and setting the gyro about the vertical axis, but since wandering of the gyro is usually accompanied by the tilt of the gyro axis, it is desirable to cage the gyro about the horizontal axis at the same time that it is locked about the vertical axis. For this purpose, a caging member 21 is provided that is pivoted at 22 upon ring 5 and has a forked end 23 adapted to engage the frame 8 on opposite sides of the axis 9 when said caging member 21 is swung up against the tension of spring 24 into contact with the ring 8. To swing the caging member 21 into engagement with ring 8, there is provided a vertically slidable collar 26 on bearing 11, the top of which collar is adapted to engage and raise a spring pressed pin 27 carried by caging member 21, the spring 28 of pin 27 serving to cushion the upward movement of the caging member.

For raising and lowering the collar 26, there is provided a forked yoke 29 having pins 30 projecting into an annular slot 31 provided in collar 26. Yoke 29 is fixed upon the inner end portion of a rod 31' having a ball 32 provided at its outer end. Ball 32 is seated on an annular thrust socket provided in the hollow stem 19 and is retained in cooperative relation with such socket by a cross-pin 33 carried by stem 19. Yoke 29 has trunnions 34 that ride on inclined planes or slides 35 mounted on the bottom of casing 2. With knob 20 pushed in into its out-of-the-way uncaged position, trunnions 34 rest on the lower portions of slides 35 and the collar 26 is in its lower position, so that caging member 21 is lowered, permitting free movement of the gyro about a horizontal axis. When knob 20 is pulled out, the trunnions 34 are caused to ride up on slides 35, thereby causing yoke 29 to raise collar 26 which, acting through pin 27, serves to raise caging member 21 and lock the gyro in a horizontal position about its horizontal axis. It will be noted that this caging mechanism is effective in any displaced position of the gyro around its horizontal axis up to the maximum of 90°.

It will thus be seen that by pulling knob 20 outwardly, not only is pinion 17 meshed with gear 18 to lock the gyro against movement around the vertical axis, but also the cage 21 is operated upwardly to cage the gyro around the horizontal axis 9. Similarly, by pushing knob 20 in into its out-of-the-way position, the pinion 17 is moved out of mesh with gear 18 and cage 21 is lowered.

A bank indicator is preferably positioned as near the scale 4 and pointer 15 as possible to enable simultaneous reading of both indications, and is hence shown mounted on the face of the instrument just below scale 4. It is shown as comprising a downwardly curved or bowed transparent tube 37, preferably of glass, for viewing the ball 38.

By having the bank indicator adjacent the scale 4 and pointer 15, the pilot is enabled to read both indications at once and hence can readily turn his craft through the desired angle in azimuth while maintaining the proper banking angle.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to obtain by Letters Patent is:

1. In a directional gyroscope, a casing, a gyro mounted therein for three degrees of freedom, including a vertical ring mounted for movement about a vertical axis through a complete revolution and a bearing frame journaled therein for oscillation about a horizontal axis, a setting knob positioned in front of said casing and arranged for movement toward and from said casing, a cage adapted to lock said frame about said horizontal axis, a member having an inclined surface, actuating means for said cage including a yoke attached to said knob and having a fulcrum movable over said inclined surface to move said cage to effect the locking of said frame by movement of said knob outwardly away from said casing, a gear on said ring, and a pinion connected to said knob and adapted to mesh with said gear when knob is pulled outwardly, whereby said gyro may be set in any desired position in azimuth while caged by rotating said knob, the pushing of said knob inwardly into an out-of-the-way position adjacent said casing serving to free said gyro and gears.

2. In a device of the character described, a casing, a gyro mounted therein with three degrees of freedom, including freedom about horizontal and vertical axes, gearing for locking and setting said gyro about the vertical axis, means for caging said gyro about the horizontal axis including a caging member, a vertically movable collar for actuating said caging member, an inclined surface, a pivotally mounted yoke connected to said collar at one end and having its fulcrum slidable in contact with said inclined surface to raise and lower the same, and a single knob positioned in front of said casing and pivotally anchored to said yoke at the outer end of said yoke for simultaneously actuating said yoke and said locking and setting gearing.

3. In a directional gyroscope, a casing, a gyro mounted therein, means for caging said gyro and for setting the same, and a knob positioned exteriorly of said casing and connected to said caging and setting means for operating the same, said knob being arranged to be positioned immediately adjacent said casing in an out-of-the-way position when said gyro is free, said caging and setting means including a vertically movable collar, a slideway inclined in the direction of travel of said collar, and a yoke member movable in contact with said slideway and connected to said knob and to said collar for converting outward movement of the former into upward movement of the latter.

4. In a directional gyroscope, a fixed housing, a ring rotatably mounted in said housing about a vertical axis, a rotor bearing casing pivotally mounted in said ring for oscillation about a horizontal axis, a locking member movably mounted on said vertical ring and adapted to engage said casing to lock the same about said horizontal axis, a sleeve slidably mounted for movement along said vertical axis in said housing for engaging the member to raise and lower the same, a setting knob slidably and rotatably mounted in said casing and adapted, when pulled out, to reset the gyroscope, a pivoted and slidable member pivotally anchored at one end to said knob and having a slidable connection with said sleeve at the other end, the fulcrum thereof engaging and being slidable over an inclined plane to raise said sleeve and thereby operate said locking member as the knob is pulled outwardly, and complementary gearing on said ring and knob respectively and adapted to be brought into engagement upon a pulling out of said knob for turning said ring and member about said vertical axis while said casing is locked about its horizontal axis.

BERT G. CARLSON.